United States Patent
Okuno et al.

(10) Patent No.: US 7,007,525 B2
(45) Date of Patent: Mar. 7, 2006

(54) ELECTRIC STEERING LOCK DEVICE

(75) Inventors: Masanari Okuno, Aichi (JP);
Tomoyuki Funayama, Toyota (JP);
Toshio Asahi, Toyota (JP); Tomoo Kakegawa, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/508,346

(22) PCT Filed: Mar. 24, 2003

(86) PCT No.: PCT/JP03/03489

§ 371 (c)(1),
(2), (4) Date: Sep. 20, 2004

(87) PCT Pub. No.: WO03/080407

PCT Pub. Date: Oct. 2, 2003

(65) Prior Publication Data

US 2005/0127753 A1    Jun. 16, 2005

(30) Foreign Application Priority Data

Mar. 22, 2002    (JP) .......................... 20020-081722

(51) Int. Cl.
*B06R 25/02*    (2006.01)

(52) U.S. Cl. ....................................... 70/186

(58) Field of Classification Search .......... 70/182–186, 70/252, 280–282; 292/144
See application file for complete search history.

(56) References Cited

U.S. PATENT DOCUMENTS

| | | | | |
|---|---|---|---|---|
| 1,786,186 A | * | 12/1930 | Bauermeister | 70/52 |
| 3,622,718 A | * | 11/1971 | Lipschutz | 200/43.03 |
| 3,959,996 A | * | 6/1976 | Thirion | 70/186 |
| 3,985,009 A | * | 10/1976 | Lipschutz | 70/252 |
| 4,116,024 A | * | 9/1978 | Lipschutz | 70/201 |
| 5,595,079 A | * | 1/1997 | Myers | 70/233 |
| 5,685,180 A | * | 11/1997 | Qualters et al. | 70/188 |
| 6,363,762 B1 | * | 4/2002 | Kueng | 70/278.3 |
| 6,543,262 B1 | * | 4/2003 | Limburg et al. | 70/186 |
| 6,647,751 B1 | * | 11/2003 | Zillmann | 70/186 |
| 6,675,673 B1 | * | 1/2004 | Starken | 74/527 |
| 6,755,058 B1 | * | 6/2004 | Zillmann | 70/252 |
| 2001/0025516 A1 | * | 10/2001 | Starken | 70/186 |
| 2002/0023468 A1 | | 2/2002 | Frick et al. | |

FOREIGN PATENT DOCUMENTS

| | | |
|---|---|---|
| JP | 59-014562 | 1/1984 |
| JP | 60-148751 | 8/1985 |
| JP | 10-264770 | 10/1998 |

* cited by examiner

*Primary Examiner*—Lloyd A. Gall
(74) *Attorney, Agent, or Firm*—Patterson, Thuente Skaar & Christensen, P.A.

(57) ABSTRACT

An electric steering lock device which can prevent a motor from being overloaded and can increase the drive force of the motor. The electric steering lock device of the present invention has a lock bar which moves according to the movement of a cam follower. The cam follower relatively moves in a spiral cam groove in accordance with the rotation of a rotary plate driven by an electric motor, thereby the cam follower moves along the radial direction of the rotary plate. The cam follower can be disengaged from the cam groove via the end portions of the cam groove according to the rotation of the rotary plate. When the cam follower is disengaged from the cam groove, the rotation of the rotary plate is permitted.

20 Claims, 6 Drawing Sheets

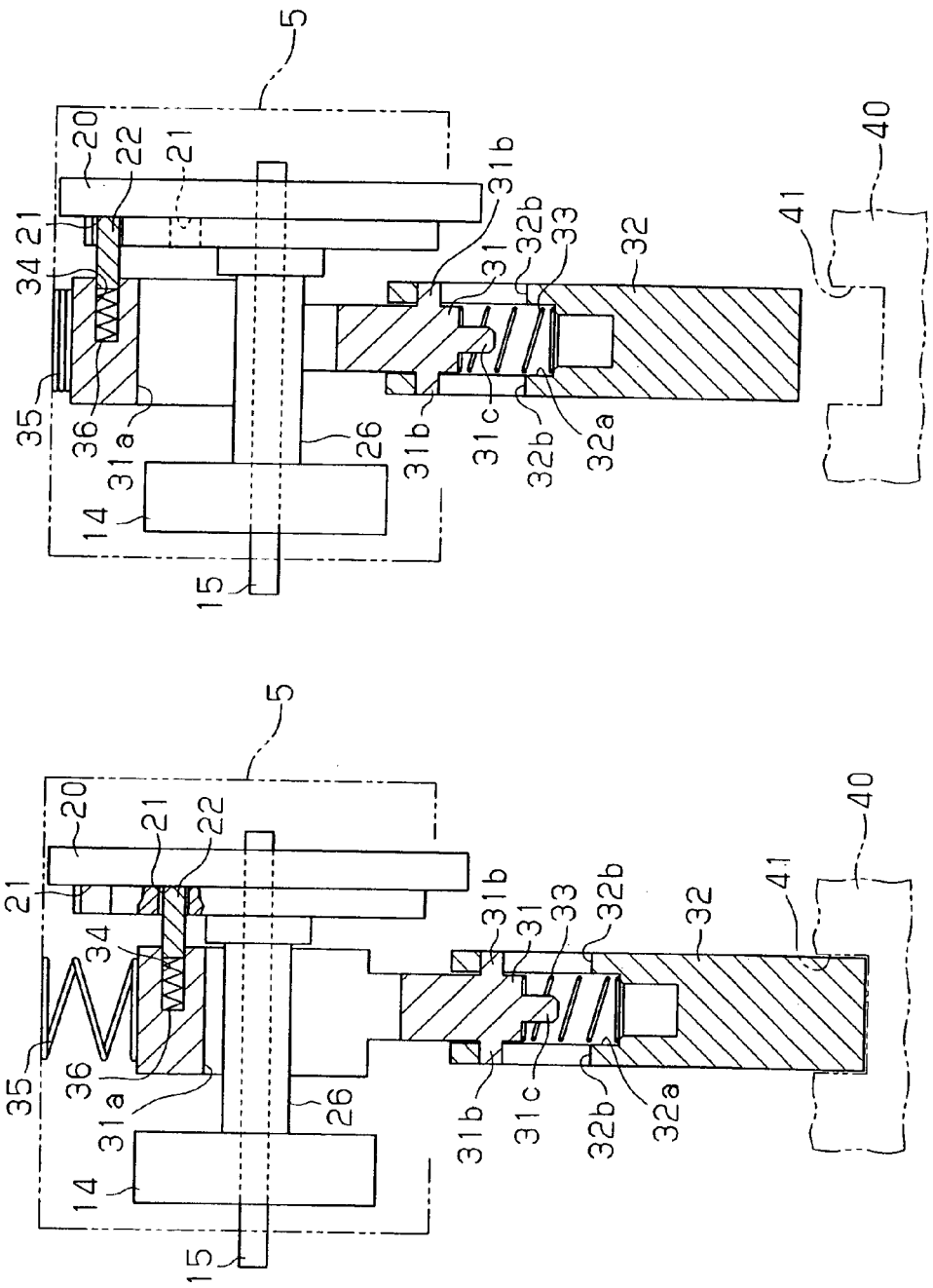

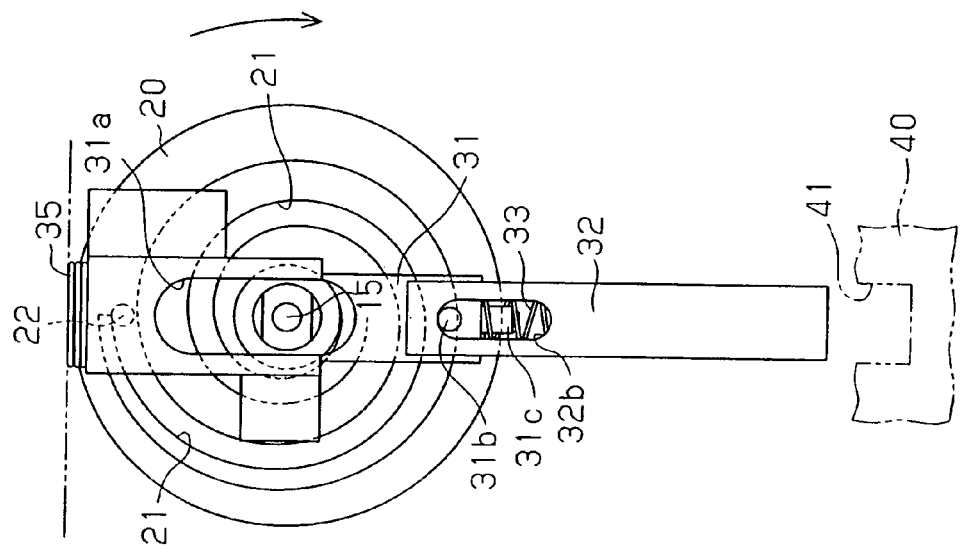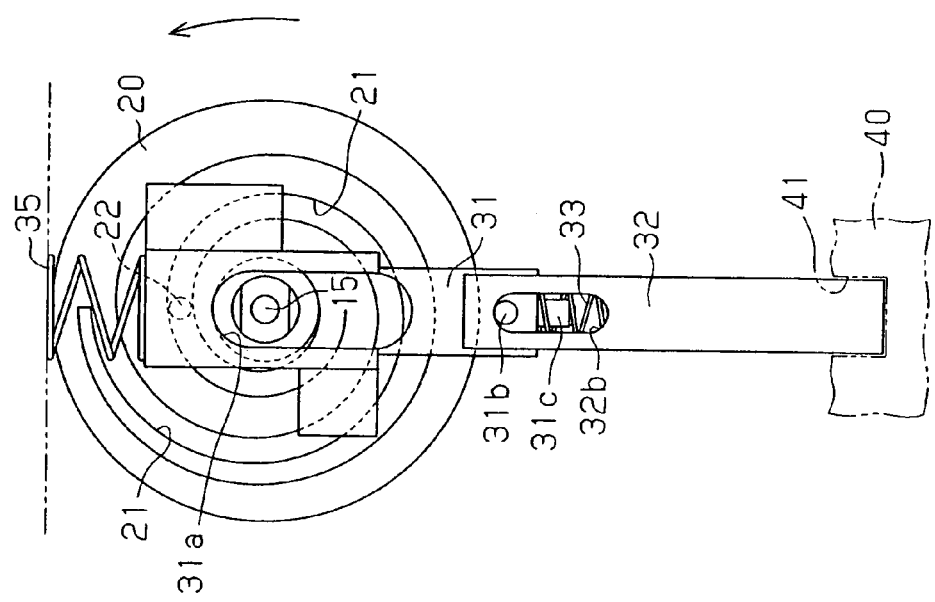

ELECTRIC STEERING LOCK DEVICE

FIELD OF THE INVENTION

The present invention relates to an electric steering lock device for automobiles.

BACKGROUND OF THE INVENTION

An ordinary electric steering lock device has a lock bar which is driven by a cam coupled to a motor. The lock bar is movable between a lock position where it is engaged with the steering shaft of a vehicle and an unlock position where it is not engaged with the steering shaft. When the lock bar is engaged with the steering shaft, the steering shaft is locked so that the steering shaft is not operable. When the lock bar is not engaged with the steering shaft, the steering shaft is unlocked so that the steering shaft is operable.

When the motor is kept running while the lock bar is at the lock position or at the unlock position, the motor may be overloaded. In this respect, an electric steering lock device equipped with a clutch mechanism has been proposed. The clutch mechanism is provided in the power transmission path between the motor and the cam to selectively block power transmission between the motor and the cam.

To quickly and surely lock and unlock the steering shaft, it is desirable to increase the drive force of the motor. However, the conventional clutch mechanism is so constructed as to be likely to be disengaged even with a relatively small load. Therefore, the drive force of the motor cannot be made so large.

SUMMARY OF THE INVENTION

It is an object of the present invention to provide an electric steering lock device which can prevent a motor from being overloaded and increase the drive force of the motor.

To achieve the object, the invention provides an electric steering lock device for selectively locking a movable member which moves in response to a steering wheel. The electric steering lock device has a motor, a rotary body, a cam follower, and a lock member. The rotary body is selectively rotated in a first direction and a second direction opposite to the first direction. The rotary body has a cam groove which extends spirally around the central axis of the rotary body. The cam groove has an inside end portion which is provided radially inward in the rotary body and an outside end portion which is provided radially outward in the rotary body. The cam follower is engageable with the cam groove. As the rotary body rotates while the cam follower is engaged with the cam groove, the location of the cam groove engaged with the cam follower shifts. As a result, the cam follower moves along the radial direction of the rotary body. The cam follower moves in the direction toward the central axis of the rotary body when the rotary body rotates in the first direction. The cam follower moves in the direction away from the central axis of the rotary body when the rotary body rotates in the second direction. The lock member is coupled to the cam follower. The lock member moves between a position where it is engaged with the movable member to lock the movable member and a position where it is disengaged from the movable member to unlock the movable member in accordance with movement of the cam follower. As the rotary body rotates in the first direction, the inside end portion of the cam groove permits the cam follower to be disengaged from the cam groove. As the rotary body rotates in the second direction, the outside end portion of the cam groove permits the cam follower to be disengaged from the cam groove. This permits rotation of the rotary body with the cam follower disengaged from the cam groove.

BRIEF DESCRIPTION OF DRAWINGS

FIG. 2A is a partial cross-sectional view showing a state in which a steering shaft is locked by the electric steering lock device shown in FIG. 1.

FIG. 2B is a partial cross-sectional view showing a state in which the steering shaft is unlocked by the electric steering lock device shown in FIG. 1.

FIG. 3A is a front view showing a state in which a steering shaft is locked by the electric steering lock device shown in FIG. 1.

FIG. 3B is a front view showing a state in which the steering shaft is unlocked by the electric steering lock device shown in FIG. 1.

DESCRIPTION OF THE PREFERRED EMBODIMENTS

One embodiment of the present invention will now be described with reference to drawings.

Figure 1:
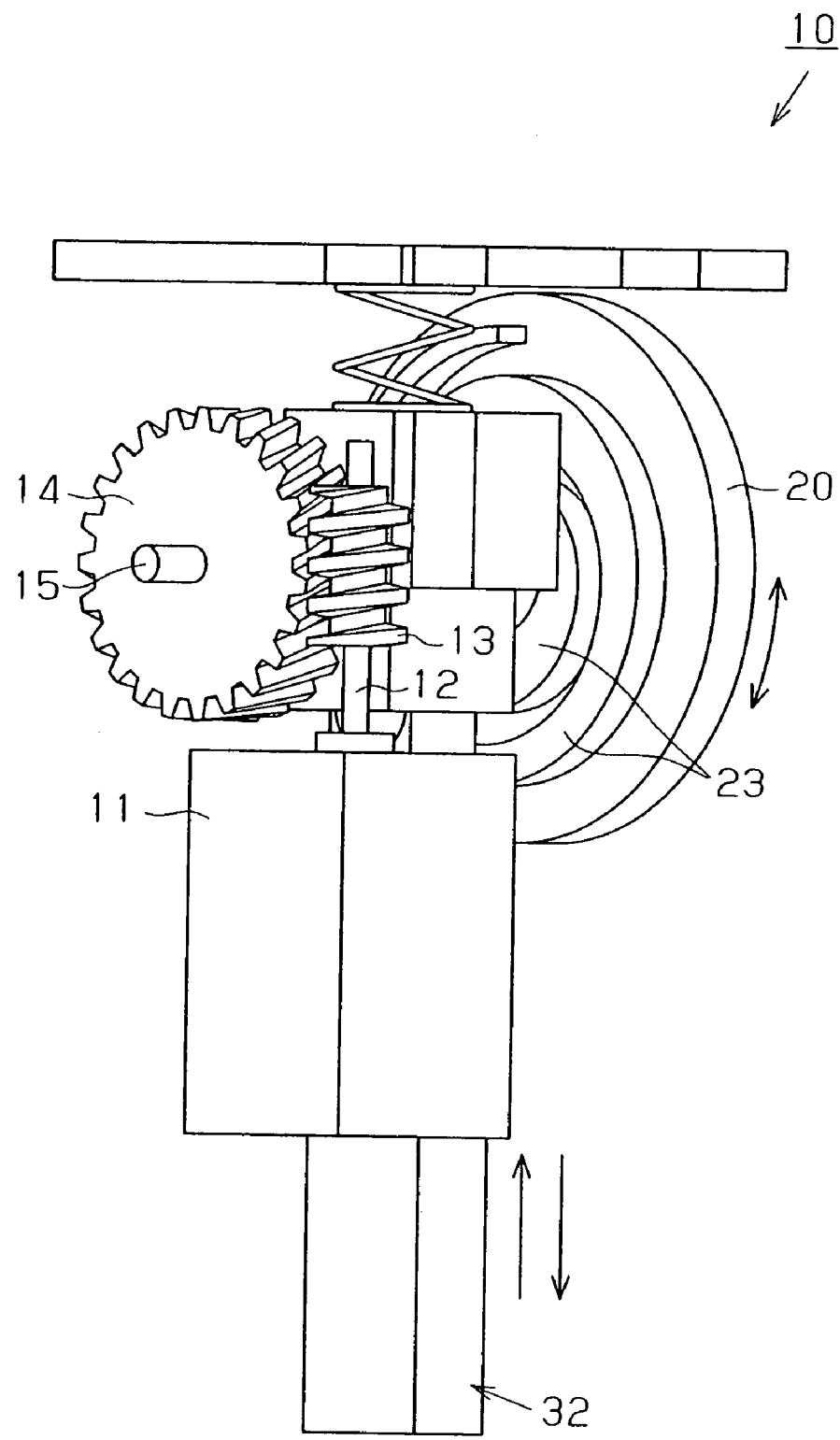
FIG. 1 is a perspective view showing an electric steering lock device according to one embodiment of the present invention.

An electric steering lock device 10 shown in FIG. 1 is attached to an unillustrated steering post of a vehicle. As shown in FIGS. 2A and 2B, the electric steering lock device 10 is housed in a case 5.

As shown in FIG. 1, the electric steering lock device 10 has an electric motor 11 which is driven by a vehicle-mounted battery. The operation of the electric motor 11 is controlled by an unillustrated control unit. A worm 13 is provided on a drive shaft 12 of the electric motor 11. The worm 13 rotates together with the drive shaft 12. The worm 13 engages with a worm wheel 14 fixed to a driven shaft 15 and rotates the worm wheel 14 and the driven shaft 15.

As shown in FIGS. 2A and 2B, a rotary body or a disk-like rotary plate 20 is fixed to the driven shaft 15. The rotary plate 20 rotates counterclockwise as indicated by the arrow in FIG. 3A with the driven shaft 15 as its center when the drive shaft 12 of the electric motor 11 rotates forward. On the other hand, the rotary plate 20 rotates clockwise as indicated by the arrow in FIG. 3B with the driven shaft 15 as its center when the drive shaft 12 rotates reversely. That is, the rotary plate 20 rotates via the worm 13, worm wheel 14, and driven shaft 15 in accordance with rotation of the drive shaft 12.

As shown in FIGS. 2A and 2B, the portion of the driven shaft 15 between the worm wheel 14 and the rotary plate 20 is inserted into a hollow shaft 26 which extends from the rotary plate 20. The driven shaft 15 is also supported by the case 5 in a rotatable manner.

A lock stopper 31 is provided between the worm wheel 14 and the rotary plate 20. The lock stopper 31 has an elongated hole 31a. The shaft 26 is inserted into the elongated hole 31a. The lock stopper 31 is movable with respect to the shaft 26 along the direction in which the elongated hole 31a extends (upward and downward directions in FIGS. 2A and 2B).

Two convex portions 31b for engagement and a projection 31c are provided at the distal end of the lock stopper 31. The two convex portions 31b for engagement protrude in the opposite directions from each other along the direction orthogonal to the longitudinal direction (upward and downward directions in FIGS. 2A and 2B) of the lock stopper 31. The distal end of the lock stopper 31 is coupled to a lock member or a lock bar 32.

An insertion groove 32a is formed at the proximal end of the lock bar 32. The proximal end of the lock bar 32 is two-forked by the insertion groove 32a. Two engagement holes 32b are provided in the two-forked portion of the lock bar 32. The engagement holes 32b are elongated holes and communicate with the insertion groove 32a. The distal end of the lock stopper 31 is inserted in the insertion groove 32a. Each of the convex portions 31b for engagement of the lock stopper 31 is inserted into the corresponding engagement hole 32b. Each convex portion 31b for engagement is movable along the direction in which the corresponding engagement hole 32b extends (upward and downward directions in FIGS. 2A and 2B) in the engagement hole 32b. Therefore, the lock stopper 31 and the lock bar 32 are relatively movable along the longitudinal directions thereof.

A first coil spring 33 is housed in the insertion groove 32a. One end of the first coil spring 33 abuts on a shoulder formed in the insertion groove 32a. The other end of the first coil spring is fitted into the projection 31c. The first coil spring 33 urges the lock stopper 31 and the lock bar 32 in a direction to position them away from each other.

Figure 4:
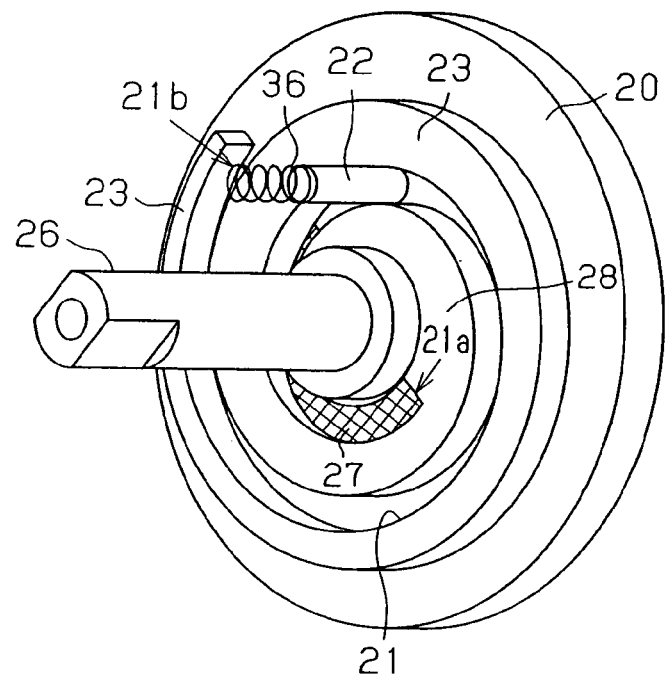
FIG. 4 is a perspective view of the electric steering lock device shown in FIG. 1.
Figure 5:
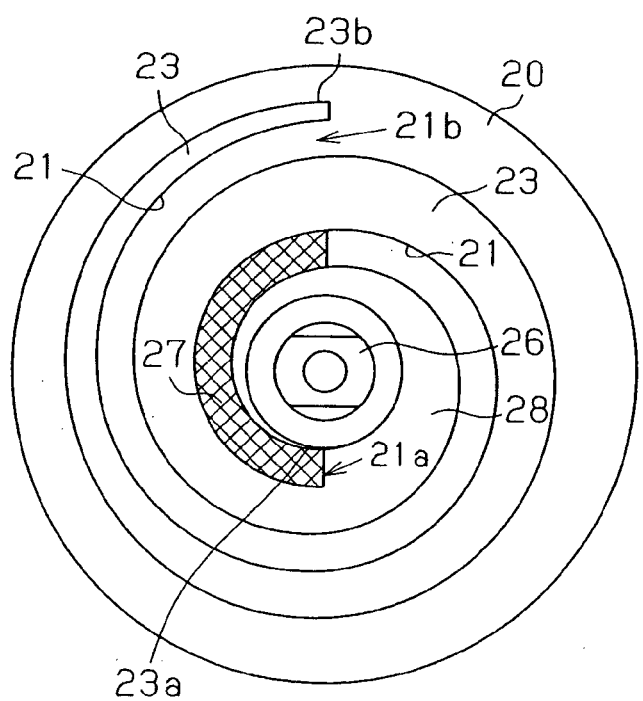
FIG. 5 is a front view of a rotary plate shown in FIG. 4.

As shown in FIGS. 4 and 5, a protrusion 23 extending spirally around the central axis of the rotary plate 20 is formed on a surface of the rotary plate 20 facing the lock stopper 31. The protrusion 23 has an inside end portion 23a located in the vicinity of the central axis of the rotary plate 20 and an outside end portion 23b located on the peripheral portion of the rotary plate 20. A cam groove 21 is formed between two parts of the protrusion 23 adjacent to each other in the radial direction of the rotary plate 20. In other words, the cam groove 21 is a gap between the two parts of the protrusion 23 adjacent to each other in the radial direction of the rotary plate 20. The cam groove 21 extends spirally around the central axis of the rotary plate 20. The cam groove 21 has an inside end portion 21a located in the vicinity of the central axis of the rotary plate 20 and an outside end portion 21b located on the peripheral portion of the rotary plate 20.

The depth of the cam groove 21 is uniform except that of the portion thereof in the vicinity of the inside end portion 21a. The bottom surface of the part of the cam groove 21 around the inside end portion 21a as indicated with shade in FIGS. 4 and 5 slants so that the depth of the cam groove 21 becomes smaller as it comes closer to the inside end portion 21a. Specifically, the bottom surface of the part of the cam groove 21 around the inside end portion 21a is a slanted surface 27 slanted with respect to the plane surface orthogonal to the axis of the rotary plate 20. The slanted surface 27 connects smoothly to the surface 28 of the protrusion 23 facing the lock stopper 31 at the inside end portion 21a.

As shown in FIGS. 2A and 2B, a housing recess portion 34 is formed on the surface of the lock stopper 31 facing the rotary plate 20. A cam follower 22 having a circular cross section and a second coil spring 36 are housed in the housing recess portion 34. The width of the cam follower 22 is smaller than the width of the cam groove 21. The distal end of the cam follower is engageable with the cam groove 21. The second coil spring 36 urges the cam follower 22 so as to detach it from the housing recess portion 34. That is, the second coil spring 36 urges the cam follower 22 toward the rotary plate 20. Further in other words, the second coil spring 36 urges the distal end of the cam follower 22 engaged in the cam groove 21 toward the bottom surface of the cam groove 21.

A third coil spring 35 is arranged between the upper wall of the case 5 and the lock stopper 31. The third coil spring 35 urges the lock stopper 31 in the direction away from the upper wall of the case 5. Therefore, the distal end of the cam follower 22 is urged in the direction of the central axis of the rotary plate 20. The third coil spring 35 has a greater spring coefficient than that of the first coil spring 33.

Next, the operation of the electric steering lock device 10 will be discussed.

The electric steering lock device 10 selectively locks a movable member, i.e., a steering shaft 40 which moves in response to an unillustrated steering wheel. At the time of locking, as shown in FIGS. 2A and 3A, the distal end of the lock bar 32 is engaged with a recess portion 41 provided at the steering shaft 40. Hereinafter, the position of the lock bar 32 when the distal end of the lock bar 32 is engaged with the recess portion 41 is called the "lock position." When the steering shaft 40 is locked, the steering wheel becomes inoperable.

At the time of unlocking the locked steering shaft 40, the control unit rotates the drive shaft 12 of the electric motor 11 forward. Then, the rotary plate 20 rotates in the counterclockwise direction as indicated by the arrow in FIG. 3A. At this time, the cam follower 22 relatively moves toward the outside end portion 21b in the cam groove 21. Therefore, the cam follower 22 linearly moves in the radially outward direction in the rotary plate 20. This causes the distal end of the lock bar 32 to move so as to disengage from the recess portion 41, as shown in FIGS. 2B and 3B. As a result, the steering shaft 40 is unlocked. Hereinafter, the position of the lock bar 32 when the distal end of the lock bar 32 is not engaged with the recess portion 41 is called the "unlock position".

Figure 7A:
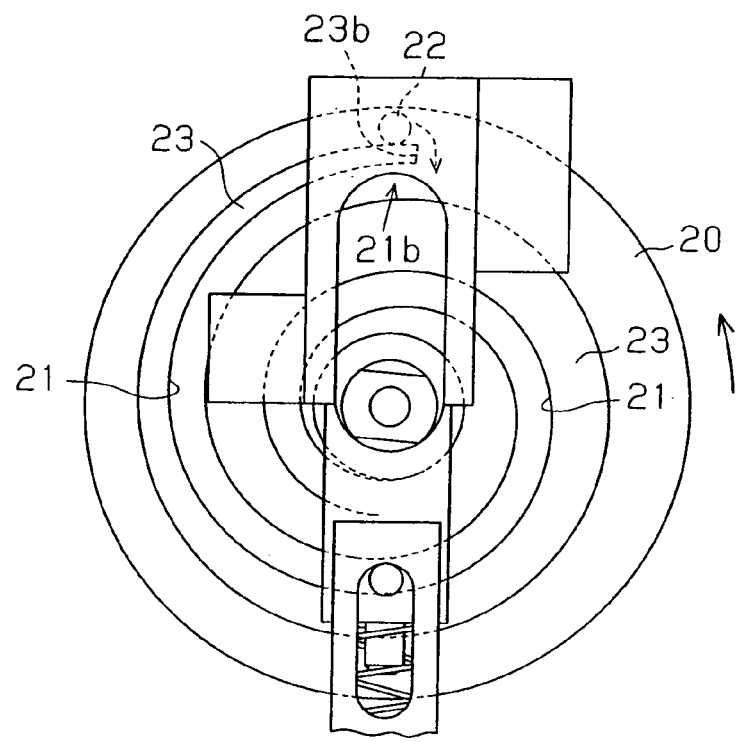
FIGS. 7A and 7B are front views for explaining the operation of the electric steering lock device shown in FIG. 1 when the drive shaft of an electric motor maintains forward rotation.
Figure 7B:
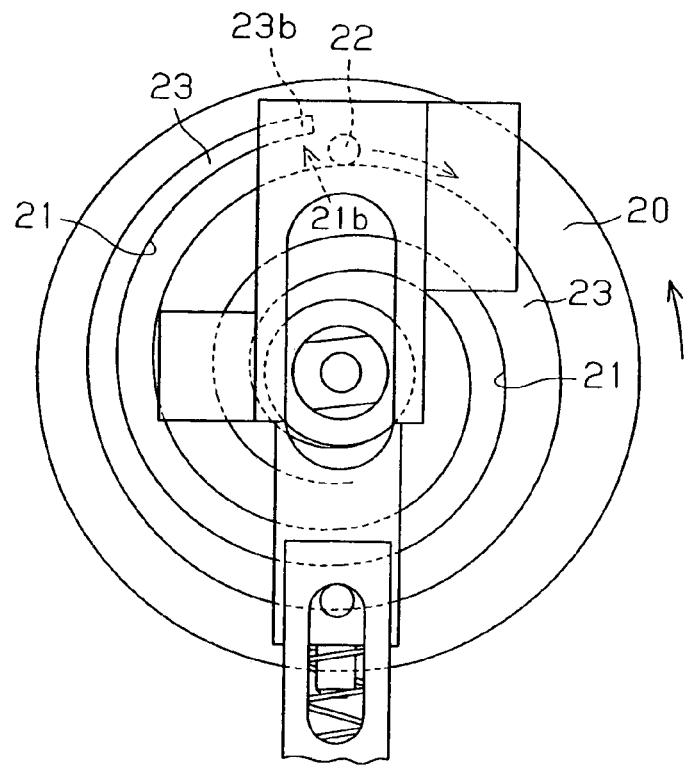

In the case where the drive shaft 12 keeps rotating further forward after the lock bar 32 reaches the unlock position, the cam follower 22 is disengaged from the cam groove 21 via the outside end portion 21b. The cam follower 22, when disengaged from the cam groove 21, moves in the clockwise direction with respect to the rotary plate 20 along the outside surface of the protrusion 23 as shown in FIG. 7B. When the rotary plate 20 rotates for another 360 degrees in the counterclockwise direction as indicated by the arrow in FIG. 7B, the cam follower 22 reaches the outside end portion 23b of the protrusion 23 as shown in FIG. 7A. When the drive shaft 12 further rotates forward, the cam follower 22, as urged by the third coil spring 35, moves in the radially inward direction in the rotary plate 20 so as to abut on the outside surface of the protrusion 23 adjacent to the outside end portion 23b as shown in FIG. 7B. The moved cam follower 22 slides along the outside surface of the protrusion 23 with respect to the rotary plate 20 in response to the forward rotation of the drive shaft 12. Thus, when the lock bar 32 is in the unlock position, the cam follower 22 continues to slide on the peripheral portion of the rotary plate 20 without restricting the rotation of the rotary plate 20. Accordingly, the rotary plate 20 can run idle with respect to the cam follower 22 while maintaining the state in which the steering shaft 40 is unlocked.

At the time of locking the unlocked steering shaft 40, the control unit rotates the drive shaft 12 of the electric motor 11 reversely. Then, the rotary plate 20 rotates in the clockwise direction as indicated by the arrow in FIG. 3B. At this time, the cam follower 22 relatively moves toward the inside end portion 21a in the cam groove 21. Therefore, the cam follower 22 moves linearly toward the central axis of the rotary plate 20. This causes the distal end of the lock bar 32 to move so as to be engaged with the recess portion 41, as shown in FIGS. 2A and 3A. As a result, the steering shaft 40 is locked.

Figure 6A:
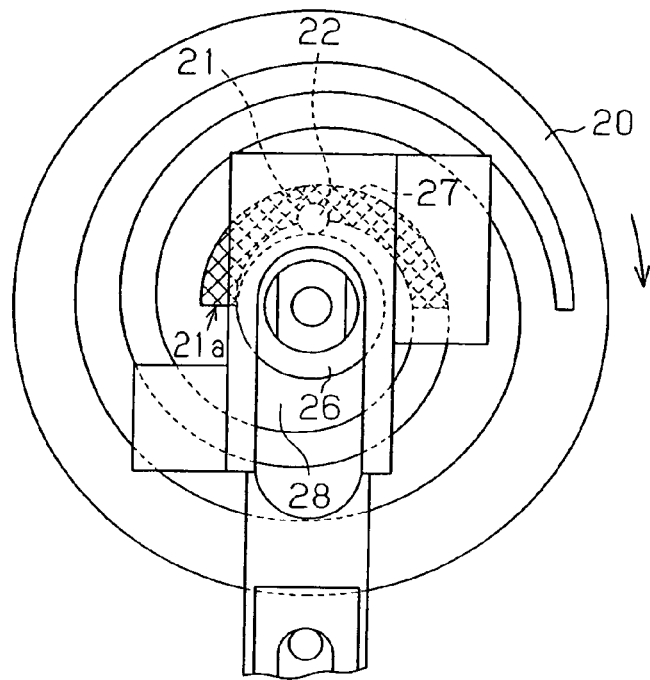
FIGS. 6A and 6B are front views for explaining the operation of the electric steering lock device shown in FIG. 1 when the drive shaft of an electric motor maintains reverse rotation.
Figure 6B:
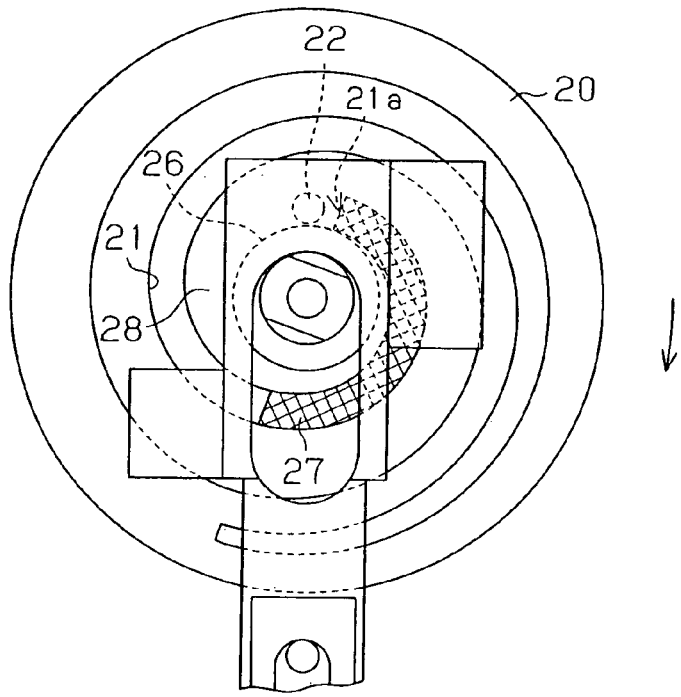

In the case where the drive shaft 12 of the electric motor 11 further maintains reverse rotation after the lock bar 32 reaches the lock position, the cam follower 22 is disengaged from the cam groove 21 via the inside end portion 21a. The cam follower 22, when disengaged from the cam groove 21, moves in accordance with the reverse rotation of the drive shaft 12, in the counterclockwise direction with respect to the rotary plate 20 along the outside surface of the shaft 26 being urged by the third coil spring 35 toward the central axis of the rotary plate 20 as shown in FIG. 6B. When the rotary plate 20 further rotates in the clockwise direction as indicated by the arrow in FIG. 6B, the distal end of the cam follower 22 eventually reaches the inside end portion 21a via the surface 28 of the protrusion 23 facing the lock stopper 31 as shown in FIG. 6A. The cam follower 22 when located at the inside end portion 21a continues to slide on the outside surface of the shaft 26 in accordance with the reverse rotation of the drive shaft 12. Thus, even if the drive shaft 12 continues its reverse rotation when the lock bar 32 is in the lock position, the cam follower 22 continues to slide on the inner circumferential portion of the rotary plate 20 without restricting the rotation of the rotary plate 20. Accordingly, the rotary plate 20 can run idle with respect to the cam follower 22 while maintaining the state in which the steering shaft 40 is locked.

The present embodiment has the following advantages.

The rotary plate 20 is permitted to rotate not only when the cam follower 22 is engaged with the cam groove 21, but also when the cam follower 22 is disengaged from the cam groove 21. That is, the rotary plate 20 is permitted to rotate whenever it is driven by the electric motor 11. This can prevent the electric motor 11 from being overloaded.

The cam follower 22, when disengaged from the cam groove 21 via the outside end portion 21b, eventually returns to the cam groove 21 via the outside end portion 21b by sliding on the rotary plate 20 along the outside surface of the protrusion 23 when the drive shaft 12 is reversely rotated. Thus, the cam follower 22 is reciprocately movable in response to the rotation of the rotary plate 20.

The cam follower 22, when disengaged from the cam groove 21 via the inside end portion 21a, eventually returns to the cam groove 21 via the inside end portion 21a by sliding on the rotary plate 20 along the outside surface of the shaft 26 when the drive shaft 12 is rotated forward. Thus, the cam follower 22 is reciprocately movable again in response to the rotation of the rotary plate 20.

The distal end of the cam follower 22 engaged with the cam groove 21 is urged toward the bottom surface of the cam groove 21 by the second coil spring 36. Therefore, the cam follower 22 is unlikely to disengage from a portion of the cam groove 21 except for the inside end portion 21a and the outside end portion 21b. This reduces the restriction on the driving force of the electric motor 11. That is, even if the driving force of the electric motor 11 is somewhat increased, the cam follower 22 can slide on the rotary plate 20 without disengaging from the portion of the cam groove 21 except for the inside end portion 21a and outside end portion 21b. The greater the driving force of the electric motor 11, the more quickly and the more reliably the steering shaft 40 is locked or unlocked.

The bottom surface of the cam groove 21 slants only at a portion around the inside end portion 21a, and no other portion slants. Therefore, compared with the case where the entire bottom surface of the cam groove 21 from the outside end portion 21b to the inside end portion 21a slants, the cam follower 22 is unlikely to disengage from the portion except the inside end portion 21a and the outside end portion 21b of the cam groove 21.

The above-described embodiment may be modified as follows.

In the above-described embodiment, only the bottom surface of the cam groove 21 around the inside end portion 21a is a slanted surface 27. However, the entire bottom surface of the cam groove 21 from the outside end portion 21b to the inside end portion 21a may be a slanted surface. That is, the entire bottom surface of the cam groove 21 may be slanted so that the depth of the cam groove 21 becomes smaller as it comes closer to the inside end portion 21a.

The invention claimed is:

1. An electric steering lock device for selectively locking a movable member which moves in response to a steering wheel, the device comprising:
    a motor;
    a rotary body which is selectively rotated in a first direction and a second direction opposite to the first direction and has a cam groove spirally extending around the central axis of said rotary body, wherein said cam groove includes an inside end portion provided radially inward in said rotary body and an outside end portion provided radially outward in said rotary body;
    a cam follower which moves along the radial direction of said rotary body when the location of said cam groove engaged with said cam follower shifts as said rotary body rotates with said cam follower engaged with said cam groove, wherein said cam follower moves in a direction toward the central axis of said rotary body when said rotary body rotates in the first direction, and said cam follower moves in a direction away from the central axis of said rotary body when said rotary body rotates in the second direction;
    a lock member which is coupled to said cam follower, moves between a position where it is engaged with said movable member to lock said movable member and a position where it is disengaged from said movable member to unlock said movable member in accordance with movement of said cam follower;
    wherein as said rotary body rotates in said first direction, said inside end portion of said cam groove permits said cam follower to be disengaged from said cam groove, and as said rotary body rotates in said second direction, said outside end portion of said cam groove permits said cam follower to be disengaged from said cam groove, thereby permitting rotation of said rotary body with said cam follower disengaged from said cam groove.

2. The device according to claim 1, wherein as said rotary body rotates in said second direction, said cam groove permits said cam follower, disengaged from said cam groove, to enter into said cam groove.

3. The device according to claim 1, wherein said cam groove includes a bottom surface and said rotary body includes a surface orthogonal to the axis of said rotary body, and the bottom surface of said cam groove is slanted with respect to the surface orthogonal to the axis of said rotary body so that the depth of the cam groove becomes smaller as it comes closer to said inside end portion.

4. The device according to claim 1, wherein said rotary body has a peripheral surface coaxial with said rotary body which permits said cam follower disengaged from said cam groove via said inside end portion to slide on said peripheral surface, wherein the distance between said cam follower when sliding on the peripheral surface, and central axis of said rotary body, is equal to the distance between said cam follower when located at said inside end portion of said cam groove and the central axis of said rotary body.

5. The device according to claim 1 wherein as said rotary body rotates in said first direction, said cam groove permits said cam follower, when disengaged from said cam groove, to enter into said cam groove.

6. The device according to claim 1, wherein said rotary body has a protrusion spirally extending around the central axis of said rotary body, said protrusion including two parts that are adjacent to each other in the radial direction of the rotary body, and said cam groove is formed by a gap between said two parts.

7. The device according to claim 6, wherein said cam follower, when disengaged from said cam groove via said outside end portion, slides on the outside surface of the part of said protrusion positioned outermost in the radial direction of said rotary body.

8. The device according to claim 1, further comprising an urging member which urges said cam follower toward the bottom surface of said cam groove.

9. The device according to claim 1, further comprising an urging member which urges said cam follower toward the central axis of said rotary body.

10. The device according to claim 2, wherein said cam groove includes a bottom surface and said rotary body includes a surface orthogonal to the axis of said rotary body, and the bottom surface of said cam groove is slanted with respect to the surface orthogonal to the axis of said rotary body so that the depth of the cam groove becomes smaller as it comes closer to said inside end portion.

11. The device according to claim 2, wherein said rotary body has a peripheral surface coaxial with said rotary body which permits said cam follower disengaged from said cam groove via said inside end portion to slide on said peripheral surface, wherein the distance between said cam follower when sliding on the peripheral surface, and central axis of said rotary body, is equal to the distance between said cam follower when located at said inside end portion of said cam groove and the central axis of said rotary body.

12. The device according to claim 3, wherein said rotary body has a peripheral surface coaxial with said rotary body which permits said cam follower disengaged from said cam groove via said inside end portion to slide on said peripheral surface, wherein the distance between said cam follower when sliding on the peripheral surface, and central axis of said rotary body, is equal to the distance between said cam follower when located at said inside end portion of said cam groove and the central axis of said rotary body.

13. The device according to claim 2, wherein as said rotary body rotates in said first direction, said outside end portion of said cam groove permits said cam follower, when disengaged from said cam groove, to enter into said cam groove.

14. The device according to claim 3, wherein as said rotary body rotates in said first direction, said cam groove permits said cam follower, when disengaged from said cam groove, to enter into said cam groove.

15. The device according to claim 4, wherein as said rotary body rotates in said first direction, said cam groove permits said cam follower, when disengaged from said cam groove, to enter into said cam groove.

16. The device according to claim 2, wherein said rotary body has a protrusion spirally extending around the central axis of said rotary body, said protrusion including two parts that are adjacent to each other in the radial direction of the rotary body, and said cam groove is formed by a gap between said two parts.

17. The device according to claim 3, wherein said rotary body has a protrusion spirally extending around the central axis of said rotary body, said protrusion including two parts that are adjacent to each other in the radial direction of the rotary body, and said cam groove is formed by a gap between said two parts.

18. The device according to claim 4, wherein said rotary body has a protrusion spirally extending around the central axis of said rotary body, said protrusion including two parts that are adjacent to each other in the radial direction of the rotary body, and said cam groove is formed by a gap between said two parts.

19. The device according to claim 5, wherein said rotary body has a protrusion spirally extending around the central axis of said rotary body, said protrusion including two parts that are adjacent to each other in the radial direction of the rotary body, and said cam groove is formed by a gap between said two parts.

20. The device according to claim 2, further comprising an urging member which urges said cam follower toward the bottom surface of said cam groove.

* * * * *